US005472800A

United States Patent [19]
Goto et al.

[11] Patent Number: 5,472,800
[45] Date of Patent: Dec. 5, 1995

[54] HIGH-TEMPERATURE FUEL CELL WITH EXTERNAL MANIFOLDS

[75] Inventors: Hitoshi Goto; Toshikazu Nakajima; Yasuo Miyake, all of Osaka, Japan

[73] Assignee: Sanyo Electric Co., Ltd., Osaka, Japan

[21] Appl. No.: 282,234

[22] Filed: Jul. 29, 1994

[30] Foreign Application Priority Data

Jul. 30, 1993 [JP] Japan .................... 5-190632

[51] Int. Cl.$^6$ .................................. H01M 8/04
[52] U.S. Cl. .............................. 429/35; 429/38
[58] Field of Search .................. 429/34, 38, 39, 429/35, 12

[56] References Cited

U.S. PATENT DOCUMENTS

| | | | |
|---|---|---|---|
| 4,623,596 | 11/1986 | Kamoshita | 429/34 X |
| 4,670,361 | 6/1987 | Tsutsumi et al. | 429/34 |
| 5,110,692 | 5/1992 | Farooque et al. | 429/36 |
| 5,213,909 | 5/1993 | Takashima et al. | 429/26 |

FOREIGN PATENT DOCUMENTS

| | | |
|---|---|---|
| 5-151984 | 6/1993 | Japan . |
| 5-174858 | 7/1993 | Japan . |

Primary Examiner—Anthony Skapars
Attorney, Agent, or Firm—Merchant, Gould, Smith, Edell, Welter & Schmidt

[57] ABSTRACT

The present invention discloses a high-temperature fuel cell comprising a cell stack and a gas supply/exhaust manifold secured to each side surface of the cell stack with a gas-sealing sheet and an insulator being interposed therebetween. The fuel cell is characterized in that an end surface of the insulator and an opposing end surface of the manifold are inclined, so that a component of a force fastening the manifold exerts on the insulator in a direction to a space encircled by the manifold, insulator, and gas-sealing member.

15 Claims, 7 Drawing Sheets

FIG. 8

HIGH-TEMPERATURE FUEL CELL WITH EXTERNAL MANIFOLDS

BACKGROUND OF THE INVENTION

(1) Field of the Invention

The present invention relates to a high-temperature fuel cell comprising a cell stack and gas supply/exhaust manifolds secured to the cell stack's side surfaces with gas-sealing sheets and insulators being interposed therebetween, and more particularly, to a structure of the insulators and manifolds.

(2) Description of the Related Art

Figure 1:
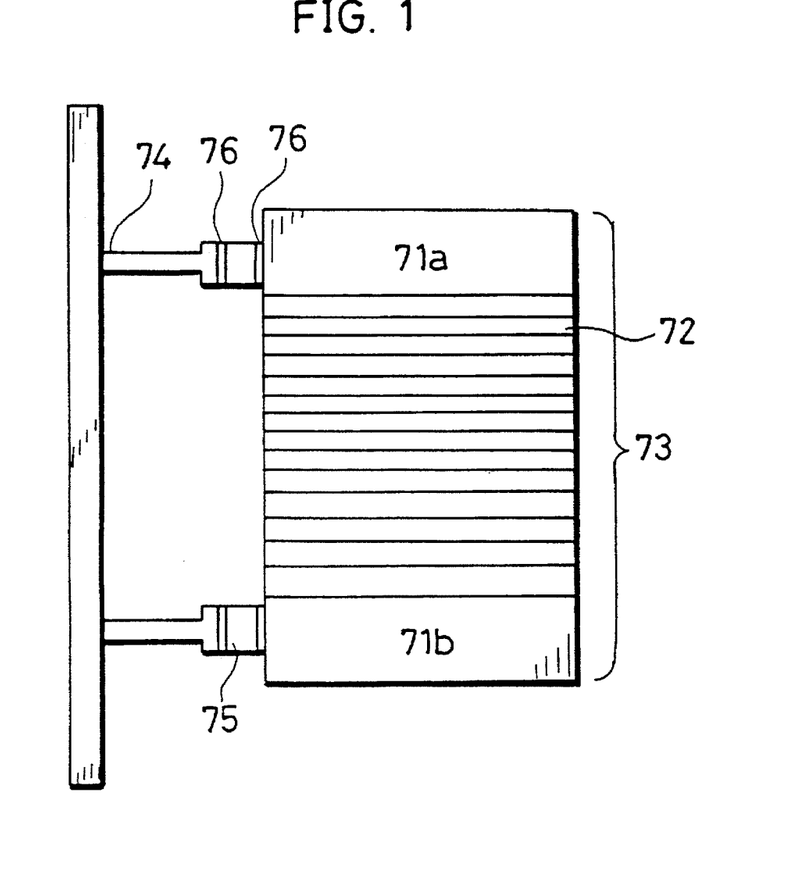
FIG. 1 is a cross-sectional view of a major part of a conventional fuel cell with external manifolds.

A conventional fuel cell with external manifolds is of a structure shown in FIG. 1. A plurality of cells 72 are layered and sandwiched by end-plates 71a and 71b to form a cell stack 73, and a reactant gas manifold 74 is secured to each side surface of the cell stack 73. Since the manifold 74 is made of metal (stainless), a frame insulator 75 is placed between the cell stack 73 and manifold 74 for insulation. Further, porous ceramic felts 76 serving as gas-sealing sheets are placed between the manifold 74 and insulator 75, and insulator 75 and cell stack 73, respectively. The manifold 74 is pressed toward the cell stack 73 by an unillustrated pressing member to be secured to the cell stack 73 with the insulator 75 and felts 76 interposed therebetween.

Figure 2:
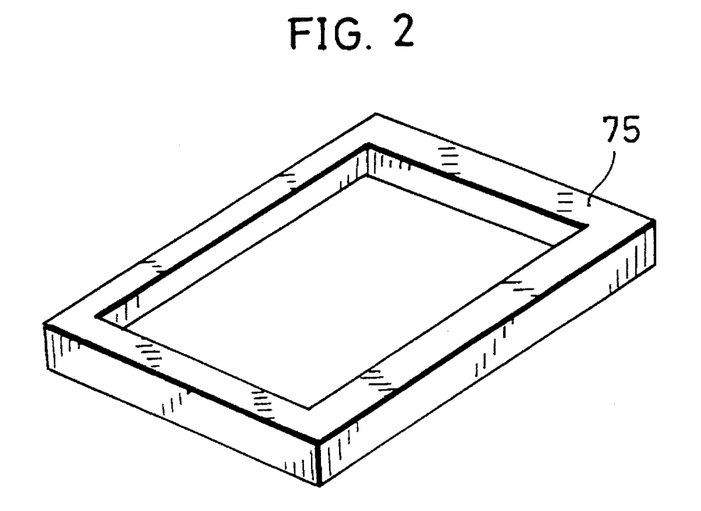
FIG. 2 is a view showing a conventional insulator.

As is shown in FIG. 2, the frame insulator 75 is a single component made of ceramics (e.g., high purity alumina) that remains stable when subject to an electrolyte, a fuel gas, and an oxidant gas at a temperature of about 650° C., a fuel cell's operating temperature.

However, the frame insulator 75 thus formed expands as the fuel cell's temperature increases during the operation, and accordingly the felts 76 have gaps with the manifold 74 and cell stack 73, causing the reactant gas to leak.

In addition, the cell stack 73, manifold 74, and insulator 75 have different coefficients of thermal expansion. Thus, a change in the fuel cell's temperature caused by the increase or decrease in temperature or an abrupt change in load within the fuel cell results in an irregular load onto the insulator 75 from the manifold 74 in a direction to the cell stack 73. Such an irregular load causes the reactant gas to leak, or worse, the insulator 75 to crack; a considerable amount of the reactant gas will leak in the latter case.

Further, since the insulator 75 is the single ceramic component, forming the same requires quite a many man-days, and retains only a low yield rate. Moreover, when a large-scale fuel cell is assembled, the insulator 75 is enlarged accordingly and baked in a corresponding size furnace, which increases the manufacturing costs undesirably.

SUMMARY OF THE INVENTION

Accordingly, the present invention has an object to provide an inexpensive high-temperature fuel cell with external manifolds which retains a reliable gas-sealing function.

The above object can be fulfilled by a high-temperature fuel cell comprising a cell stack formed of a plurality of layered cells, a reactant gas supply/exhaust manifold secured to each side surface of the cell stack with an insulator and a gas-sealing member interposed therebetween, the high-temperature fuel cell being characterized in that: at least a part of an end surface of the manifold facing to the cell stack is in an opposed relationship to the insulator; and a surface of the insulator and an opposing side surface of the manifold are inclined, so that a force fastening the manifold has a component which is exerted in the direction of a space encircled by the manifold, the insulator, and the sealing member.

According to the above construction, the opposed inclined surfaces on the manifold and insulator develop two forces being exerted on the insulator when the manifold is secured to the cell stack: a vertical force with respect to the cell stack, and a horizontal force, is a force exerted in the direction of a space encircled by the manifold, insulator, and gas-sealing member. The insulator is fastened by the horizontal force, and the outward thermal expansion of the insulator can be curbed. As a result, the insulator will not have gaps easily, effectively sealing off the gas leakage.

In addition, should the insulator crack, the gaps caused by the crack are pressed firmly by the horizontal force to make them smaller, minimizing the amount of leaking gas.

The inclined surface of the manifold may face toward the space encircled by the manifold, the insulator, and the gas-sealing member, and the inclined surface of the insulator opposing to the manifold may be parallel to the slant surface of the manifold when the high-temperature fuel cell is assembled.

The gas-sealing member may be placed between the manifold and the insulator, and the insulator and the cell stack, respectively.

The insulator may form a polygonal frame opposing to the circumference of the end surface of the manifold facing to the cell stack, and the insulator may be formed of a set of insulating members, each insulating member corresponding to each side of the polygonal frame.

When the insulator is a frame composed of a set of insulating members corresponding to the sides of the frame respectively, the insulating members are pressed toward each other by the horizontal force, further ensuring the gas-sealing effect. Thus, a single-component frame insulator is no longer necessary, and the manufacturing process can be simplified. In other words, the man-days are reduced, the yield rate is improved, each component is downsized, and the manufacturing costs are reduced.

When the high-temperature fuel cell is assembled, opposing surfaces of adjacent insulating members and an exposed surface of each insulating member may make an acute angle.

According to the above construction, the horizontal force prevents the insulating member from falling off to the space encircled by the manifold, gas-sealing member, and insulator.

The gas-sealing member may be placed between adjacent the insulating members when the insulator is assembled.

The gas-sealing member may be placed, and ceramic powders may be additionally used, between the manifold and the insulator, and the insulator and the cell stack.

The manifold expands outward as the fuel cell's temperature increases during the operation. The gas-sealing member and hence the insulating member may slide outward as well when only the gas-sealing member is placed between the manifold and insulating member, for the coefficients of friction between the insulating member and gas-sealing member, and the manifold and gas-sealing member are large. This may possibly cause gaps between the insulating members.

However, when the ceramic powders are additionally used either between the gas-sealing members and manifold or the gas-sealing member and insulator, the ceramic powders reduce, the coefficient of friction between the same. Thus, in the former case, the insulating members will not slide outward as does the gas-sealing member, while the gas-sealing member and hence the insulating member will not slide outward even when the manifold expands in the latter case.

In addition, the ceramic powders between the insulating member and manifold, and insulating member and cell stack allow the insulator to slide between the manifold and cell stack toward the space encircled by the manifold, insulator, and gas-sealing member easily, ensuring the sealing between the insulating members.

The insulator may be a square frame composed of four insulating members corresponding to the four sides of the square frame, respectively.

The above object also can be fulfilled by a high-temperature fuel cell comprising a cell stack and a reactant gas supply/exhaust manifold secured to each side surface of the cell stack with an insulator and a gas-sealing member being interposed therebetween, the high-temperature fuel cell being characterized in that: a plurality of cells are layered to be sandwiched by a pair of insulating plates to form the cell stack; an end surface of the manifold opposing a side surface of the cell stack is partly cut out; and the insulator is fitted into the cutout portion. Each of the insulator and manifold has a first surface and two second surfaces, the first surfaces opposing each other along a direction in which the manifold is secured, the two second surfaces opposing each other, each of the second surfaces being continuous with respect to their respective first surfaces. Both of the first surfaces are inclined, so that a component of the manifold's fastening force is exerted in a direction to a space encircled by the manifold, the insulator and the gas-sealing member; and each of the second surfaces is inclined, so that the second surfaces of the manifold and the insulator opposing each other are adhered by the force when the manifold is secured to the cell stack.

The inclined first surfaces of the manifold and insulator develop two forces when the manifold is secured to the cell stack as well: the vertical force and the horizontal force. The horizontal force ensures the sealing when the insulator expands.

Since both the second surfaces of the manifold and insulator are adhered when the manifold is secured to the cell stack, should the insulator crack, gaps caused by the crack can be narrowed, and gaps between the manifold and insulator can be sealed off.

The cutout portion of the manifold may be opposed at least to the plurality of the cells layered in the cell stack.

Since the insulator can be placed only where necessary, the insulator can be downsized to save the manufacturing costs.

The inclined first surface of the manifold may face toward the space encircled by the manifold, the insulator, and the gas-sealing member, and the inclined first surface of the insulator may be in a plane parallel to the inclined first surface of the manifold when the fuel cell is assembled.

The gas-sealing member may be placed between the manifold and the insulator, and the insulator and the cell stack, respectively.

Ceramic powders may be additionally used between the manifold and the insulator, and the insulator and the cell stack.

The insulator may slide outward as the manifold expands when the fuel cell's temperature increases if only the gas-sealing member is placed between the insulator and cutout of the manifold, which causes the gaps between second surfaces of the manifold and insulator.

However, according to the above construction, the ceramic powders reduce the coefficients of friction between the gas-sealing member and insulator, and the gas-sealing member and the manifold as has been explained. Thus, the insulator will not slide outward even when the manifold expands, and the second surfaces will not have gaps easily.

On the other hand, the horizontal force allows the insulator to slide easily between the manifold and cell stack to the same direction. Thus, the sealing between the manifold and insulating member can be ensured.

A circumference of the end surface of the manifold opposing to the side surface of the cell stack may form a polygonal frame, and sides thereof may be cut out.

The circumference may form a square frame, and two sides thereof may be cut out.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENTS

FIRST EMBODIMENT

Figure 3:
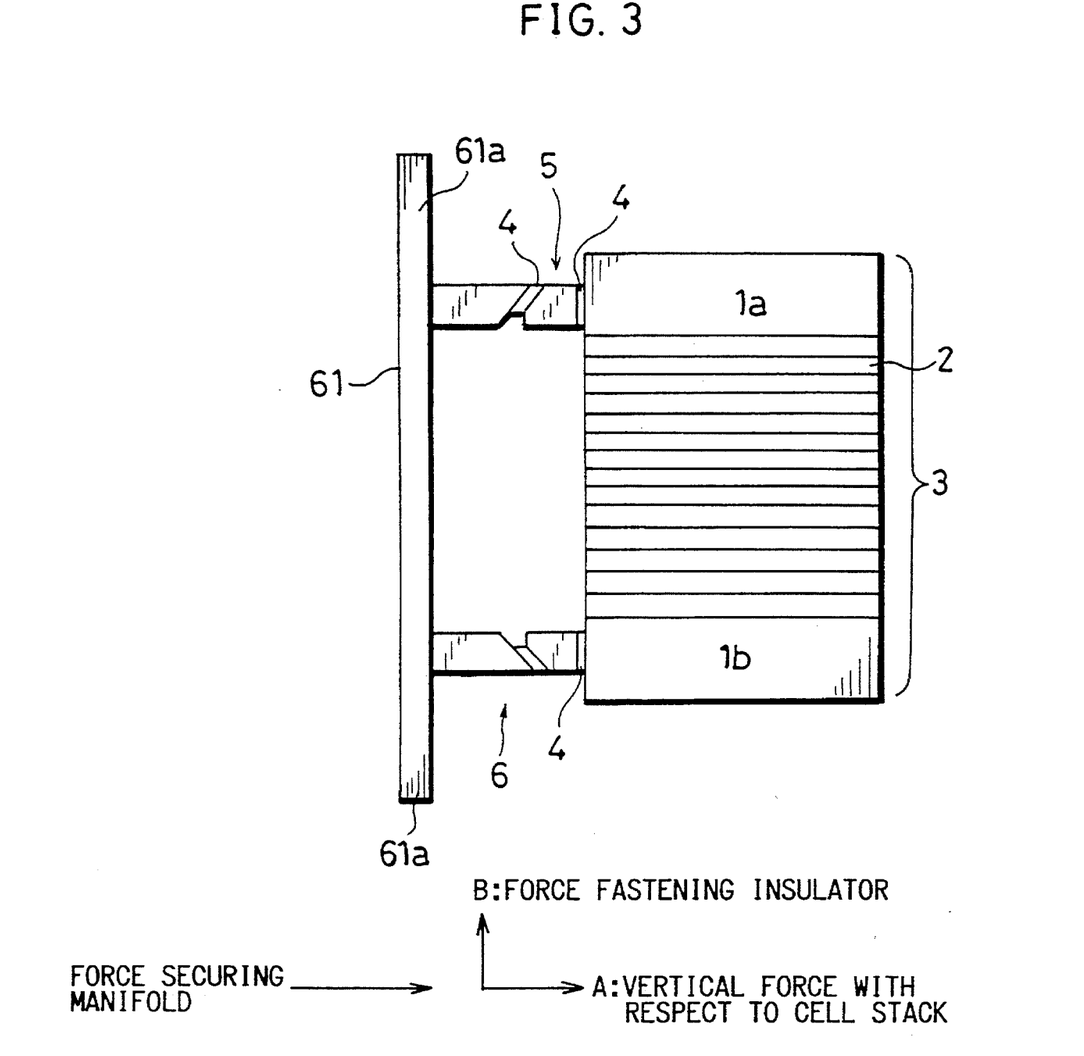
FIG. 3 is a cross-sectional view of a major part of a high-temperature fuel cell with external manifolds in accordance with a first embodiment of the present invention.

FIG. 3 is a cross-sectional view of a major part of a high-temperature fuel cell with external manifolds in accordance with a first embodiment of the present invention. A plurality of cells 2 are layered and sandwiched by end-plates 1a and 1b, which are fastened vertically by an unillustrated fastening means to form a cell stack 3. A stainless manifold 6 is secured to each side surface of the cell stack 3 with a ceramic frame insulator 5 and two gas-sealing porous ceramic sheets 4 being interposed therebetween: one porous ceramic sheet 4 is placed on the side surface of the cell stack 3, the frame ceramic insulator 5 is placed thereon, further the other porous ceramic sheet 4 is placed thereon, and the manifold 6 is placed on the second-mentioned porous ceramic sheet 4.

Figure 4:
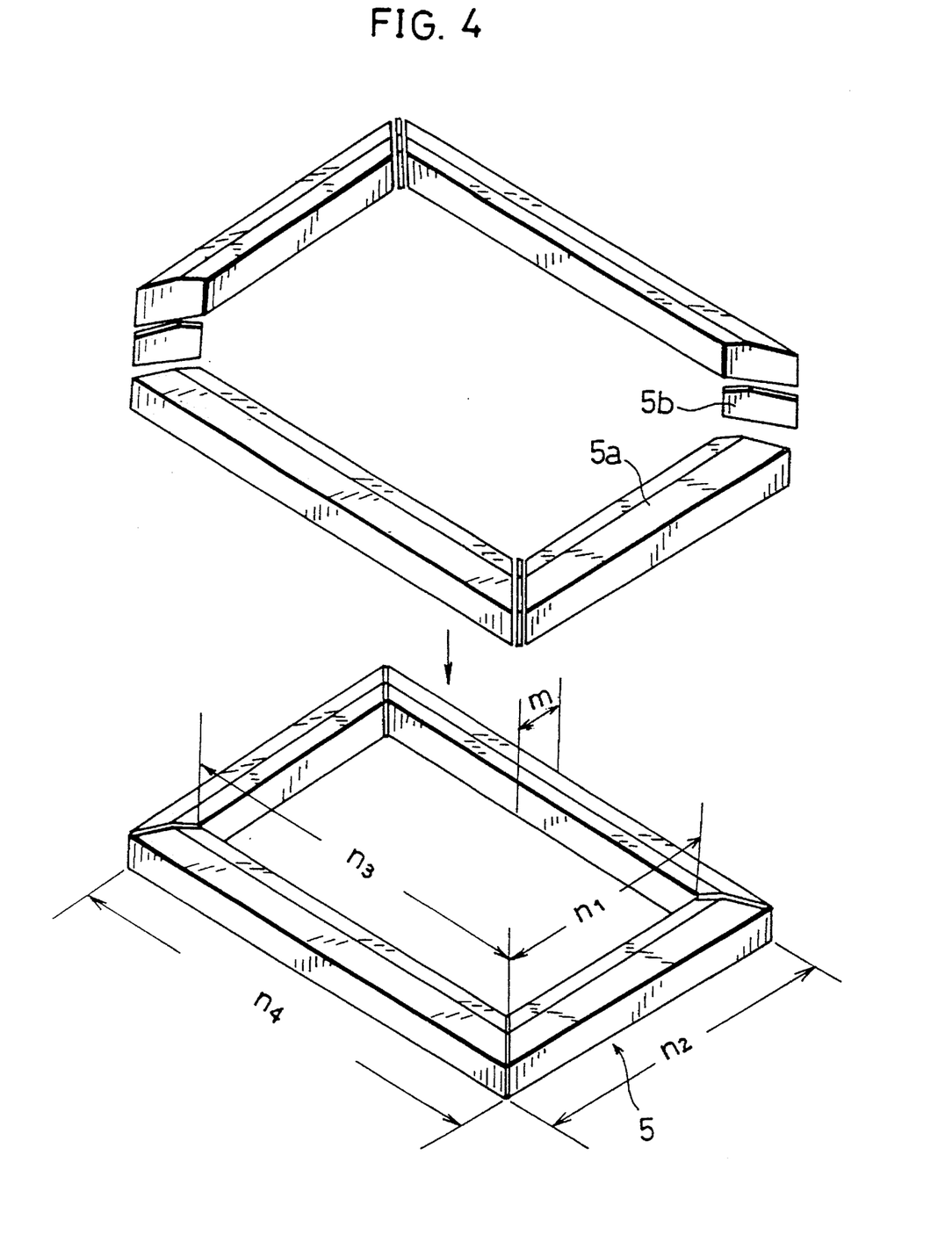
FIG. 4 is a view showing an insulator of the present invention.

As is shown in FIG. 4, the frame insulator 5 comprises four bar members 5a, similar to the ones obtained if a frame were cut at the four corners, with gas-sealing porous ceramic sheets 5b being interposed at each corner.

A surface of each bar member 5a opposing to the cell stack 3 is a plane parallel with the cell stack 3's side surface, while another surface opposing to the manifold 6 is inclined, i.e., closer to a space encircled by the insulator 5, the thicker the bar member 5a in a direction in which the same is sandwiched by the manifold 6 and cell stack 3.

Further, the bar member 5a has a thickness m (in a direction perpendicular with respect to the aforementioned direction), and side lengths $n_1$, $n_2$, $n_3$, and $n_4$, which are as thick as and as long as the counterparts of the opposing manifold 6, respectively. To be more precise, $n_1$, $n_2$, $n_3$, and $n_4$ actually may be slightly shorter than their counterpart, to take into account the porous ceramic sheets 5b interposed at each corner.

An end surface of the manifold 6 opposing the insulator 5 is also a inclined parallel to the insulator 5's inclined surface. Thus, the inclined end surface faces to a space encircled by the manifold 6, porous ceramic sheets 4, and insulator 5. Further, the manifold 6 includes a side plate 61 which has a gas inlet 62 and vertically extended flanges 61a which are used to secure the manifold 6 to the cell stack 3.

Figure 5:
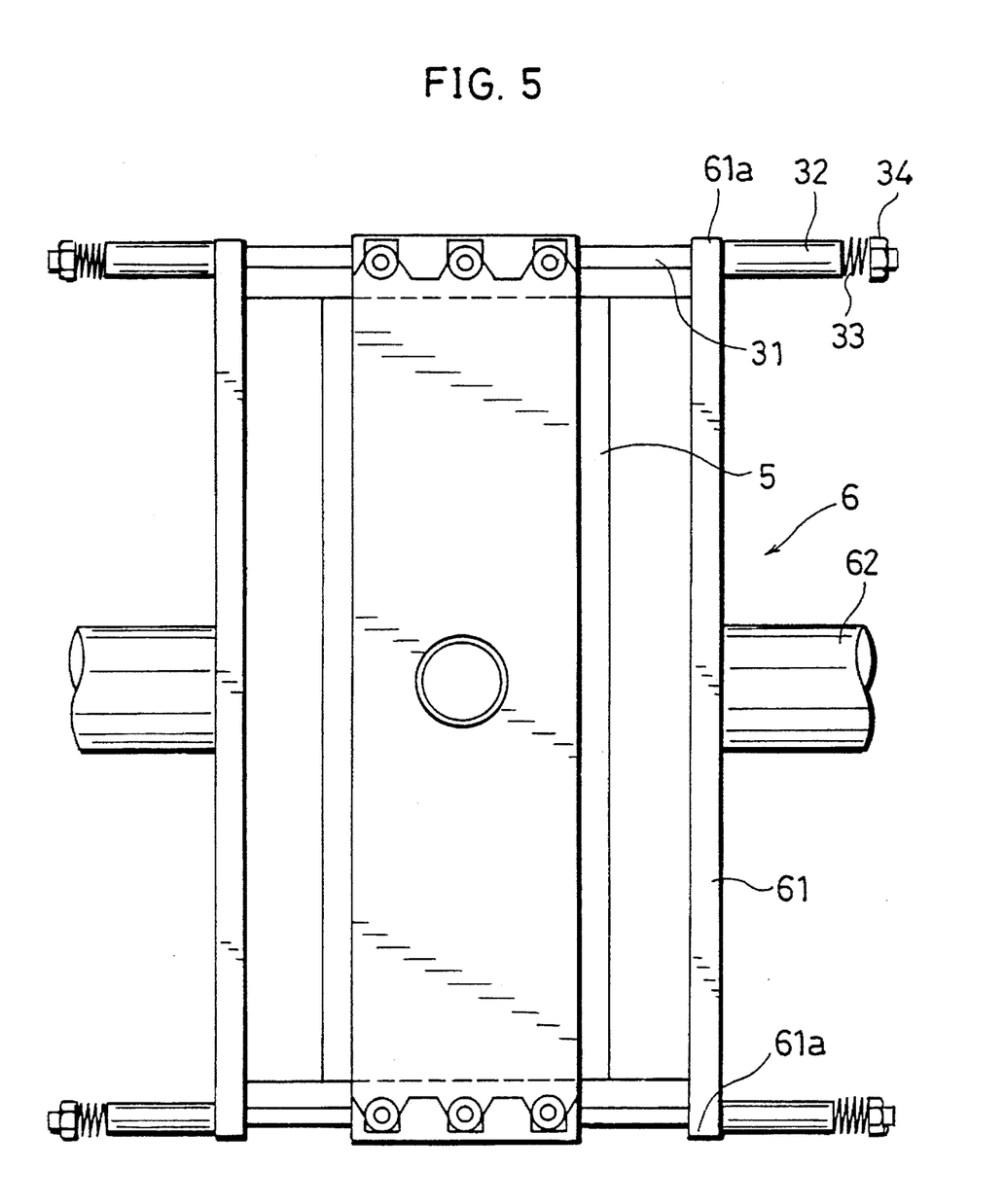
FIG. 5 is a schematic view showing how a manifold is secured to a cell stack.

The explanation of how the manifold 6 is secured to the cell stack 3 will be given in the following with reference to FIG. 5.

As has been explained, the porous ceramic sheet 4, insulator 5, another porous ceramic sheet 4, and manifold 6 are placed sequentially on the side surface of the cell stack 3. Under these conditions, a rod 31 is attached through the flange 61a and a hollow pipe 32 is fasten to a portion of the rod 31 extending from the flange 61a. Accordingly, a fastening means including a nut 34 is fastened toward the manifold 6, and then the elasticity of a spring 33 placed between the nut 34 and hollow pipe 32 presses all the foregoing elements toward the cell stack 3, securing the manifold 6 to the cell stack 3.

When the manifold 6 is secured to the cell stack 3 as above, the inclined surfaces of the manifold 6 and insulator 5 develop two force components which are exerted on the insulator 5: a vertical force component A with respect to the side surface of the cell stack 3, and a horizontal force component B exerted in a direction to fasten the insulator 5 inward, i.e. a direction toward the space encircled by the manifold 6, porous ceramic sheets 4, and insulator 5.

Note that each bar member 5a is fastened to the cell stack 3 by the force component A, and the bar members 5a are fastened to each other by the force component B. Thus, the gaps between the bar members 5a are sealed off to prevent the gas leakage.

SECOND EMBODIMENT

A high-temperature fuel cell in accordance with the second embodiment of the present invention will be explained with reference to the drawings. The cell stack is formed in the same manner as the first embodiment except that insulating plates 101a and 101b are used instead of the end-plates 1a and 1b. Also, the manifold 6 and insulator 5 are replaced with a manifold 41 and an insulator 42, respectively.

Figure 6:
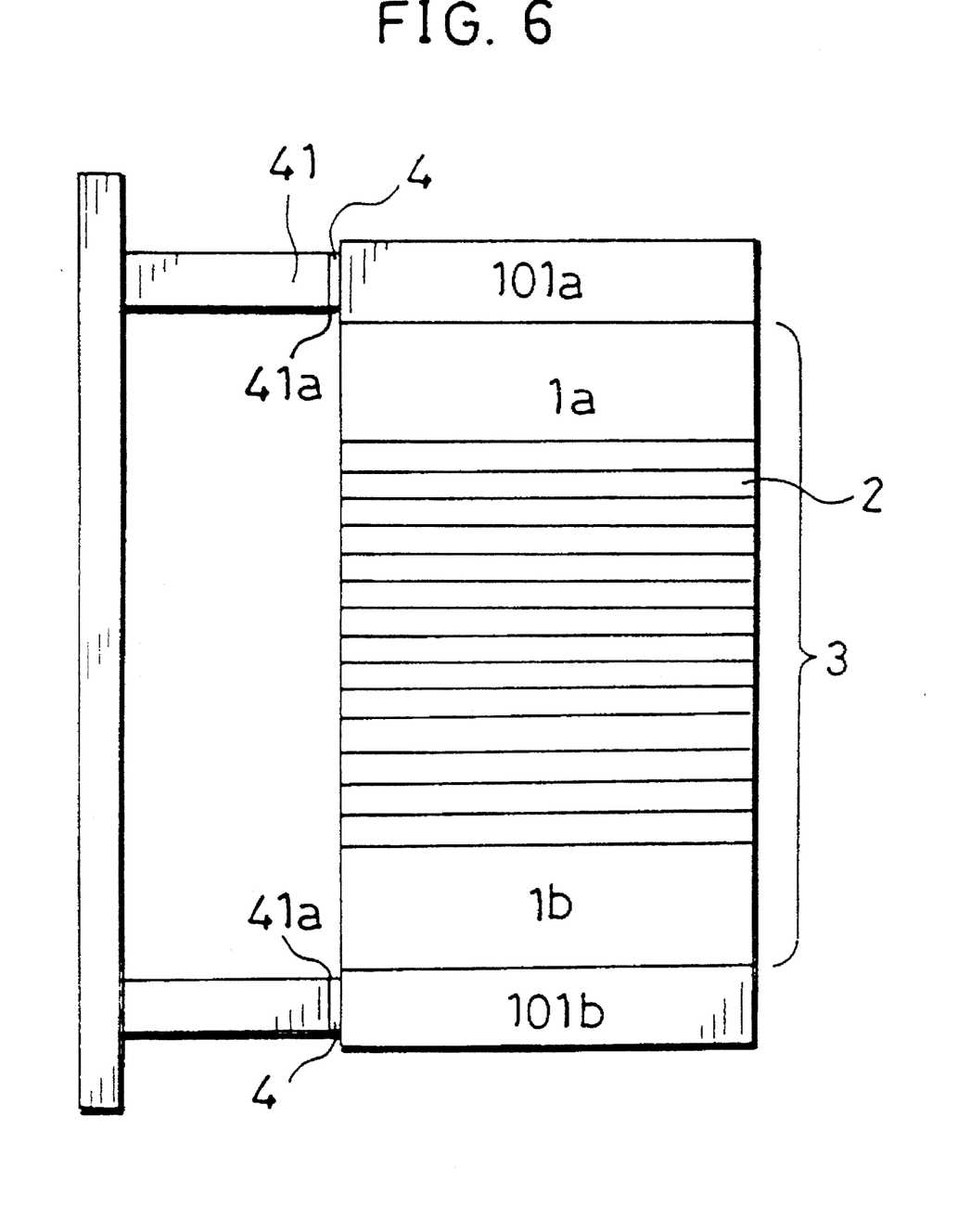
FIG. 6 is a cross-sectional view of a major part of a high-temperature fuel cell with external manifolds in accordance with a second embodiment of the present invention.
Figure 7:
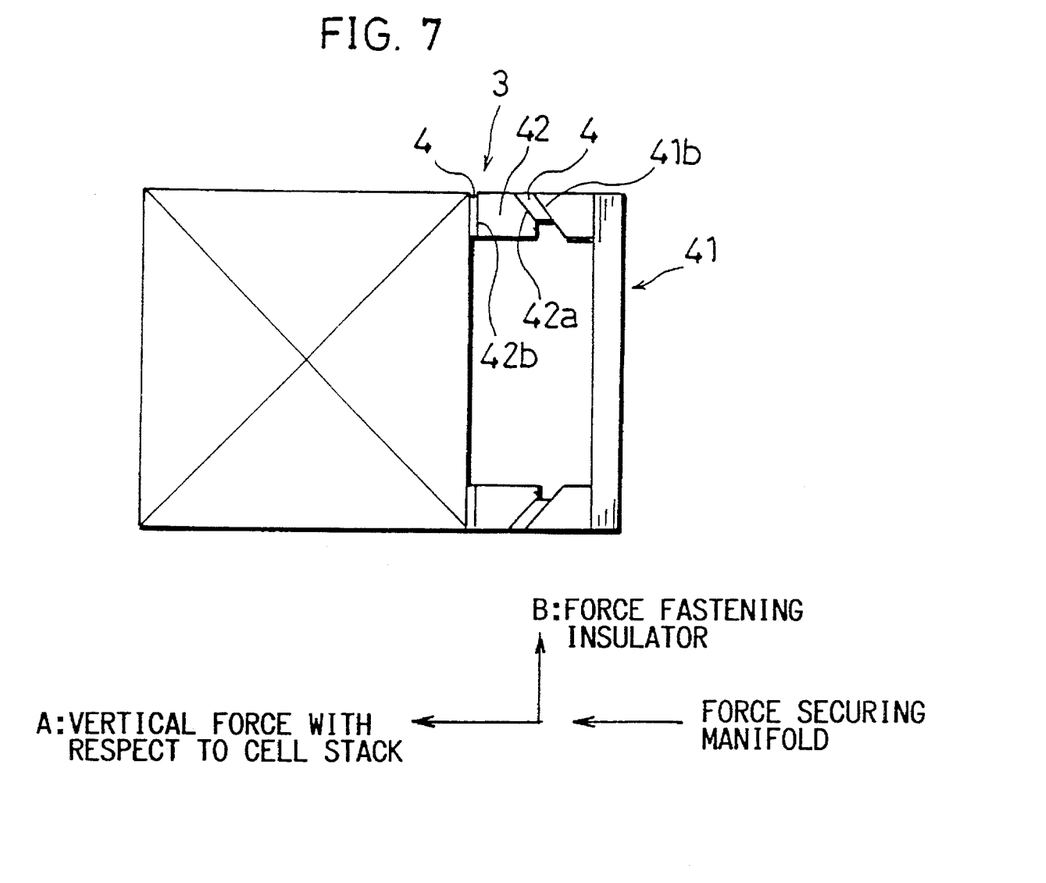
FIG. 7 is another cross-sectional view of a major part of the high-temperature fuel cell with the external manifolds in accordance with the second embodiment of the present invention.
Figure 8:
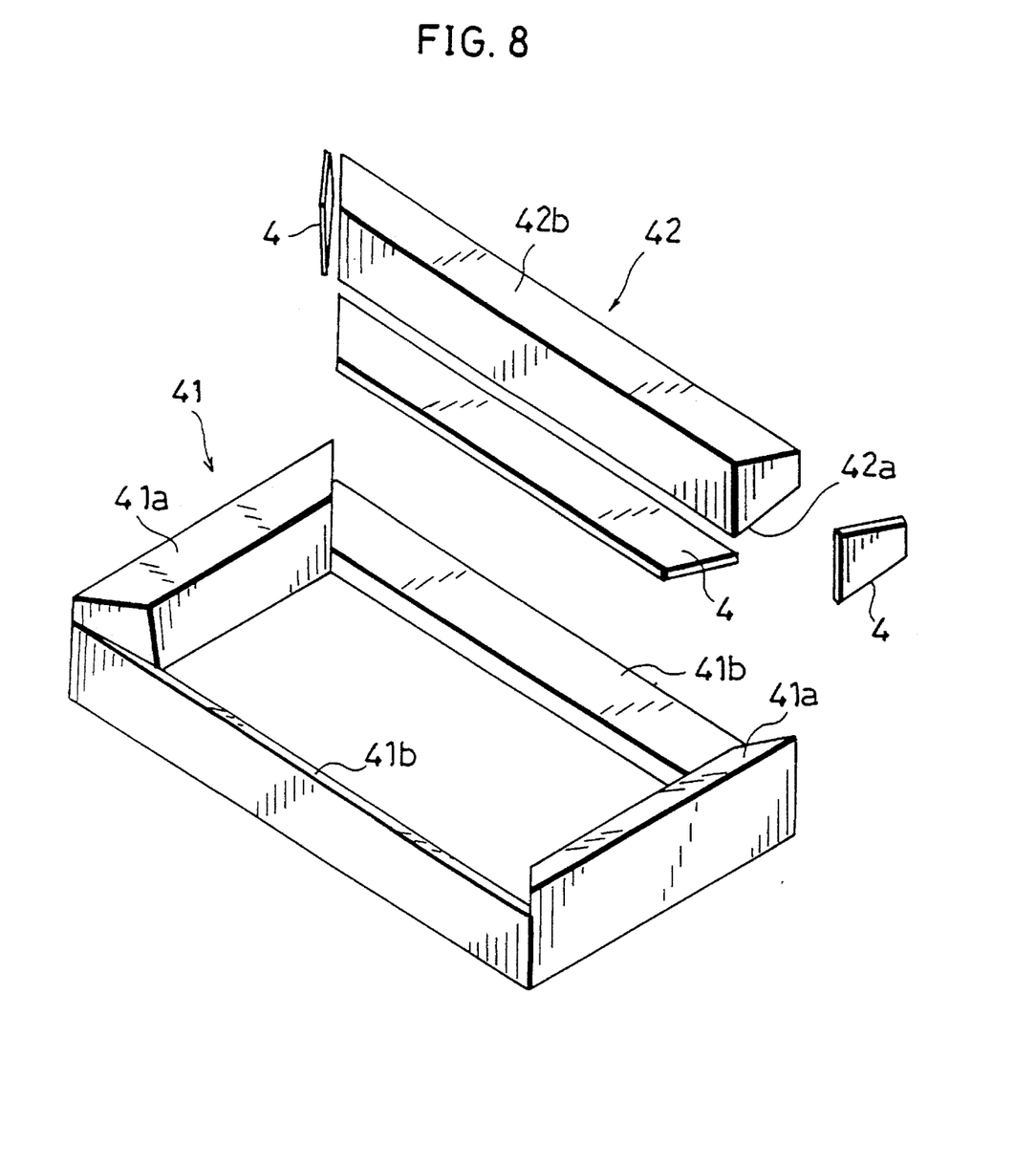
FIG. 8 is a view showing a manifold and an insulator in the second embodiment of the present invention.

FIG. 6 is a horizontal cross-sectional view of the high-temperature fuel cell with manifolds with respect to a direction in which the cells 2 are layered, and FIG. 7 is a vertical cross-sectional view of the same with respect to the layered direction. FIG. 8 is a perspective view of the manifold 41 and insulator 42.

As is shown in FIG. 6, only a gas-sealing porous ceramic sheet 4 need be placed between the cell stack 3 and two end surfaces 41a. Since the entire end surfaces 41a oppose the insulating plates 101a and 101b, respectively.

Also as is shown in FIG. 7, the porous ceramic sheet 4, insulator 42, and another porous ceramic sheet 4 are placed sequentially between the cell stack 3 and end surfaces 41b in a direction from the cell stack 3 to the manifold 41; the end surfaces 41b face toward the layered cells 2 in the cell stack 3.

As is shown in FIG. 8, four end surfaces of the manifold 41 oppose to the side surface of the cell stack 3. Two end surfaces 41a, which oppose the insulating plates 101a and 101b entirely when secured to the cell stack 3, are in planes parallel to the opposing side surface of the cell stack 3.

The other two end surfaces 41b, opposing the layered cells 2 and a part of the insulating plates 101a and 101b are cut out to form a concavity, and thus are situated at a lower position than the end surfaces 41a opposing the insulating plates 101a and 101b.

Further, the end surfaces 41b are also inclined the closer to a space encircled by the manifold 41, the thinner the manifold 41 in a direction in which the same is secured to the cell stack 3. Thus, the inclined end surface faces a space encircled by the manifold 41, porous ceramic sheets 4, and insulator 42.

The insulators 42 are placed at the cutouts separately with the porous ceramic sheets 4 interposed therebetween. The insulator 42 is a single bar whose cross section is a trapezoid to fit in the cutouts formed in the manifold 41. An end surface 42a of the insulator 42 opposing the end surface 41b of the manifold 41 is also inclined parallel to the inclined end surface 41b, while an end surface 42b opposing the side surface of the cell stack 3 is in a plane parallel with the same. Note that only one insulator 42 is shown in FIG. 8; however, a plurality of them are fit in all the cutouts in the manifold 41 separately.

Thus, the manifold 41 is engaged with the insulators 42 in such a way that the former opposes the insulating plates 101a and 101b and the latter oppose the layered cells 2, and can be secured to the cell stack 3 in the same manner as the first embodiment.

Like in the first embodiment and as is shown in FIG. 7, fastening the components as above develops a vertical force component A and a horizontal (a direction to the space encircled by the manifold 41, porous ceramic sheets 4, and insulator 42) force component B with respect toward the cell stack 3 on the inclined surfaces.

In addition, since the insulator 42 is not interposed where the manifold 41 and insulating plates 101a and 101b oppose each other, the insulator 42 can be formed of fewer components compared with the frame insulator 5 in the first embodiment, realizing further a less expensive fuel cell.

OTHER COMMENTS

1) In the foregoing embodiments, the insulator 5 is composed of a set of bar members; however, they may be a single component as long as they have the inclined surfaces explained as above.

2) In the first embodiment, the end surfaces opposing the manifold 6 and the insulator 5 are square; however, they may be circle or other polygonal. Also, the bar members do not necessarily correspond to the sides of the frame.

3) In the second embodiment, the insulator 42 was placed in the cutout; however, the shape of the manifold 41 and insulator 42 is not limited to the ones described in the above. As well, the manifold 41 is not necessary cut out in the same way as above.

4) In the forgoing embodiments, the porous ceramic sheets 4 are placed between the insulator 5 and manifold 6, or insulator 42 and cell stack 3, respectively. However, ceramic powders may be used additionally with the porous ceramic sheets 4. In case that a set of pieces form a frame insulator, the ceramic powders may be used additionally on every other piece.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A high-temperature fuel cell comprising a cell stack formed of a plurality of layered cells, a reactant gas supply/exhaust manifold secured to each side surface of said cell stack with an insulator and a gas-sealing member interposed therebetween, said high-temperature fuel cell being characterized in that:

at least a part of an end surface of said manifold facing toward said cell stack opposes said insulator; and a surface of said insulator and an opposing side surface of said manifold are inclined, so that a force fastening said manifold has a component exerted in a direction toward a space encircled by said manifold, said insulator, and said sealing member.

2. The high-temperature fuel cell of claim 1, wherein said inclined surface of said manifold faces toward said space encircled by said manifold, said insulator, and said gas-sealing member, and wherein said inclined surface of said insulator opposing said manifold is parallel to the inclined surface of said manifold when said high-temperature fuel cell is assembled.

3. The high-temperature fuel cell of claim 2, wherein said gas-sealing member is placed between said manifold and said insulator, and said insulator and said cell stack, respectively.

4. The high-temperature fuel cell of claim 1, wherein said insulator forms a polygonal frame opposing a circumference of said end surface of said manifold facing toward said cell stack, and wherein said insulator is formed of a set of insulating members, each insulating member corresponding to a side of said polygonal frame.

5. The high-temperature fuel cell of claim 1, wherein, when said high-temperature fuel cell is assembled, opposing surfaces of adjacent insulating members and an exposed surface of each insulating member make an acute angle.

6. The high-temperature fuel cell of claim 5, wherein said gas-sealing member is placed between adjacent insulating members when said insulator is assembled.

7. The high-temperature fuel cell of claim 5, wherein said gas-sealing member is placed, and ceramic powders are additionally used, between said manifold and said insulator, and said insulator and said cell stack.

8. The high-temperature fuel cell of claim 6, wherein said insulator is a square frame composed of four insulating members corresponding to four sides of said square frame, respectively.

9. A high-temperature fuel cell comprising a cell stack and a reactant gas supply/exhaust manifold secured to each side surface of said cell stack with an insulator and a gas-sealing member being interposed therebetween, said high-temperature fuel cell being characterized in that:

a plurality of cells are layered to be sandwiched by a pair of insulating plates to form said cell stack;

an end surface of said manifold opposing a side surface of said cell stack is partly cut out;

said insulator is fitted into said cutout portion;

each of said insulator and manifold has a first surface and two second surfaces, said first surfaces opposing each other along a direction in which said manifold is secured, said two second surfaces opposing each other, each of said second surfaces being continuous with respect to their respective first surfaces;

both of said first surfaces are inclined, so that a manifold's fastening force exerts a component in a direction toward a space encircled by said manifold, said insulator and said gas-sealing member; and each of said second surfaces is inclined, so that the second surfaces of said manifold and said insulator opposing each other are adhered by said force when said manifold is secured to said cell stack.

10. The high-temperature fuel cell of claim 9, wherein said cutout portion of said manifold opposes at least said plurality of said cells layered in said cell stack.

11. The high-temperature fuel cell of claim 10, wherein said inclined first surface of said manifold faces said space encircled by said manifold, said insulator, and said gas-sealing member, and wherein said inclined first surface of said insulator is in a plane parallel to said inclined first surface of said manifold when said fuel cell is assembled.

12. The high-temperature fuel cell of claim 9, wherein said gas-sealing member is placed between said manifold and said insulator, and said insulator and said cell stack, respectively.

13. The high-temperature fuel cell of claim 12, wherein ceramic powders are additionally used between said manifold and said insulator, and said insulator and said cell stack.

14. The high-temperature fuel cell of claim 10, wherein a circumference of said end surface of said manifold opposing said side surface of said cell stack forms a polygonal frame, and sides thereof are cut out.

15. The high-temperature fuel cell of claim 14, wherein said circumference forms a square frame, and two sides thereof are cut out.

* * * * *